United States Patent [19]

Sugiyama et al.

[11] 4,389,100

[45] Jun. 21, 1983

[54] OBJECTIVE SYSTEM FOR VIDEO DISC

[75] Inventors: Takahiro Sugiyama; Yukio Hagiwara, both of Tokyo, Japan

[73] Assignee: Asahi Kogaku Kogyo Kabushiki Kaisha, Tokyo, Japan

[21] Appl. No.: 358,778

[22] Filed: Mar. 17, 1982

[30] Foreign Application Priority Data

Mar. 18, 1981 [JP] Japan ................................. 56-38845

[51] Int. Cl.³ .......................... G02B 9/12; G02B 21/02
[52] U.S. Cl. ....................................... 350/478; 350/414
[58] Field of Search ....................... 350/478, 474, 414

[56] References Cited

U.S. PATENT DOCUMENTS 4,258,981 3/1981 Goto ............................. 350/414 X
4,270,843 6/1981 Goto ............................. 350/414 X

*Primary Examiner*—John K. Corbin
*Assistant Examiner*—Scott J. Sugarman
*Attorney, Agent, or Firm*—Sughrue, Mion, Zinn, Macpeak and Seas

[57] ABSTRACT

An objective system consists of three lens components, the first lens component including a positive meniscus lens convex to the light source, the second lens component including a positive meniscus lens convex to the light source, and the third lens component including a positive meniscus lens concave to the light source. The objective system for a video disc satisfying the following conditions:

$$F/0.55 < F_1 < F/0.25 \quad (1)$$

$$F/1.0 < F_2 < F/0.5 \quad (2)$$

$$F_3 > F/0.15 \quad (3)$$

$$F < |r_5| < 3F, \; r_5 < 0 \quad (4)$$

$$d_2 < 0.2F \quad (5)$$

$$d_4 < 0.3F \quad (6)$$

where F is the resultant focal length of the overall lens system, $F_i$ is the focal length of the i-th lens component, $r_i$ is the radius of curvature of the i-th surface, $d_i$ is the thickness or air gap of the i-th lens, and $N_i$ is the refractive index of the i-th lens.

3 Claims, 4 Drawing Figures

COMA ABERRATION

WAVE FRONT ABERRATION

COMA ABERRATION

WAVE FRONT ABERRATION

1

OBJECTIVE SYSTEM FOR VIDEO DISC

BACKGROUND OF THE INVENTION

This invention relates to an objective for a vide disc for a high-density information recording disc, and more particularly to an objective which is used for a video disc using a semiconductor laser as a light source.

A video disc using a semiconductor laser as a light source is well known in the art. In this system, a laser beam from the semiconductor laser is focused on the mirror surface of the disc by an objective, and the laser beam reflected by the mirror surface of the disc is returned through the objective to the semiconductor laser, more specifically to the laser beam generating point, so that the information on the disc is detected according to the intensity of the laser beam thus returned. In this operation, in order that the tracking and the focusing are carried out satisfactorily, the semiconductor laser is moved together with the objective. Accordingly, the movable objective lens must be small in size and light in weight. Furthermore, since it is required for the objective to read the information which is recorded on the disc with high density, the objective lens should have a resolution power of at least one micron, and accordingly the objective should be sufficiently larger in diameter, or it should have a numerical aperture (N.A.) of about 0.5.

This invention has developed an objective system small in size and weight for a video disc, which satisfies specific conditions and has a sufficiently long operating distance or backfocus and in which various aberrations are satisfactorily corrected.

SUMMARY OF THE INVENTION

The present invention provides as an object an objective system consists of three lens components, the first lens component including a positive meniscus lens convex to the light source, the second lens component including a positive meniscus lens convex to the light source, and the third lens component including a positive meniscus lens concave to the light source. The objective system for a video disc satisfying the following conditions:

$$F/0.55 < F_1 < F/0.25 \quad (1)$$

$$F/1.0 < F_2 < F/0.5 \quad (2)$$

$$F_3 > F/0.15 \quad (3)$$

$$F < |r_5| < 3F, r_5 < 0 \quad (4)$$

$$d_2 < 0.2F \quad (5)$$

$$d_4 < 0.3F \quad (6)$$

where F is the resultant focal length of the overall lens system, $F_i$ is the focal length of the i-th lens component, $r_i$ is the radius of curvature of the i-th surface, $d_i$ is the thickness or air pag of the i-th lens, and $N_i$ is the refractive index of the i-th lens.

DESCRIPTION OF THE PREFERRED EMBODIMENT

Figure 1:
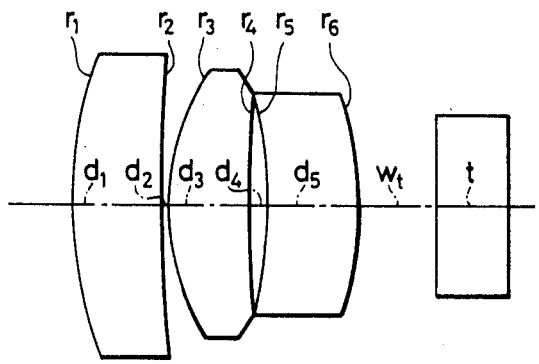
FIG. 1 is an explanatory diagram showing the arrangement of lenses in the Example 1 of an objective according to this invention.

The present invention will now be described with reference to the accompanying drawings.

The specific conditions will be described. The conditions (1) and (2) are to minimize the spherical aberration which occurs in first and second lens components. If $F_1$ and $F_2$ are smaller than the respective lower limits, the amounts of spherical aberration in the first and second lens components are excessively and accordingly the spherical aberration of the third lens component must be excessively compensated for, as a result of which the absolute value of spherical aberration becomes large. When $F_1$ and $F_2$ are greater than the respective upper limits, the amounts of spherical aberration with the first and second lens components are small, while the amount of spherical aberration in the third lens component becomes small, and therefore it is difficult to correct the spherical aberration.

The condition (3) is to determine the focal length of the third lens component, thereby to make suitable the amount of positive spherical aberration of the third lens component, so that the spherical aberration can be satisfactorily corrected. When $F_3$ is smaller than the lower limit F/0.15, the amount of positive spherical aberration of the third lens component becomes excessively small, and therefore it is difficult to correct the amounts of spherical aberration of the first and second lens components.

The condition (4) is to make suitable the amount of positive spherical aberration with the first surface ($r_5$) of the third lens component, in association with the condition (3). When $|r_5|$ is greater than the upper limit 3F, the amount of spherical aberration with the first surface ($r_5$) is small, and therefore it is difficult to correct the amounts of spherical aberration with the first and second lens components. When it is smaller than the lower limit F, the amount of correction of the spherical aberration becomes excessive, and therefore the absolute value of spherical aberration becomes large. This is undesirable.

The conditions (5) and (6) are to obtain a suitable operating distance, and to miniaturize the lens system. The conditions (5) and (6) are in association with the conditions (1) and (2). When $d_2$ and $d_4$ are greater than the respective upper limits, the operating distance is elongated while the overall physical length of lens becomes large, and therefore it is impossible to design the aimed lens small in size and small in weight.

The objective system for a video disc according to the invention is one which satisfies the above-described conditions and in which the various aberrations, especially the spherical aberration, are satisfactorily compensated for.

The numerical data of the Examples 1 and 2 of the objective system according to the invention are as listed bellow:

EXAMPLE 1

$r_1 = 6.835$    $d_1 = 1.54$    $N_1 = 1.74411$
$r_2 = 42.333$    $d_2 = 0.10$
$r_3 = 4.125$    $d_3 = 1.33$    $N_2 = 1.74411$
$r_4 = 21.293$    $d_4 = 0.33$
$r_5 = -7.392$    $d_5 = 1.52$    $N_3 = 1.74411$
$r_6 = -6.453$
$F = 4.50$
$Wt = 1.35$    N.A. = 0.50
   $t = 1.20$    $Nt = 1.49$
$F_1 = 10.75 = F/0.42$
$F_2 = 6.65 = F/0.67$
$F_3 = 40.38 = F/0.11$

EXAMPLE 2

$r_1 = 6.892$    $d_1 = 1.28$    $N_1 = 1.74411$
$r_2 = 39.758$    $d_2 = 0.10$
$r_3 = 4.148$    $d_3 = 1.31$    $N_2 = 1.74411$
$r_4 = 22.199$    $d_4 = 0.30$
$r_5 = -9.930$    $d_5 = 1.88$    $N_3 = 1.86890$
$r_6 = -8.450$
$F = 4.50$    N.A. = 0.50
$Wt = 1.35$    $t = 1.20$    $Nt = 1.49$
$F_1 = 11.02 = F/0.41$
$F_2 = 6.65 = F/0.67$
$F_3 = 41.02 = F/0.11$ where t is the thickness of the cover glass of a video disc, Nt is the refractive index of the cover glass, Wt is the aerial distance or the operating distance between the third lens component and the cover glass, and all the refractive indexes are those with respect to a ray of light having a wavelength 780 nm.

Figure 2:
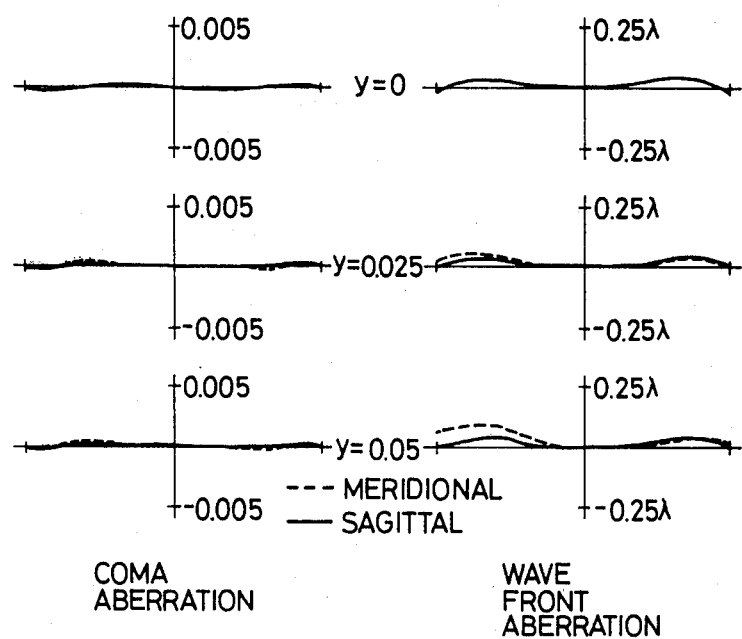
FIG. 2 is a graphical representation indicating the coma aberration and wave front aberration of the objective system shown in FIG. 1.
Figure 3:
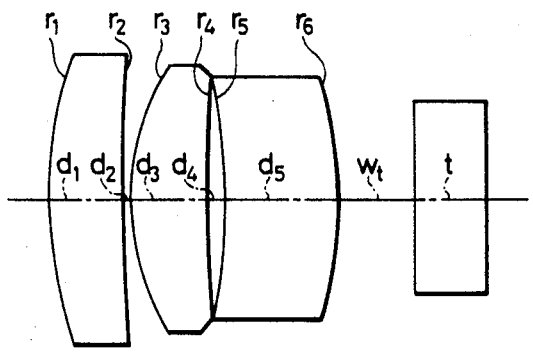
FIG. 3 is an explanatory diagram showing the arrangement of lenses in the Example 2 of the objective according to the invention.
Figure 4:
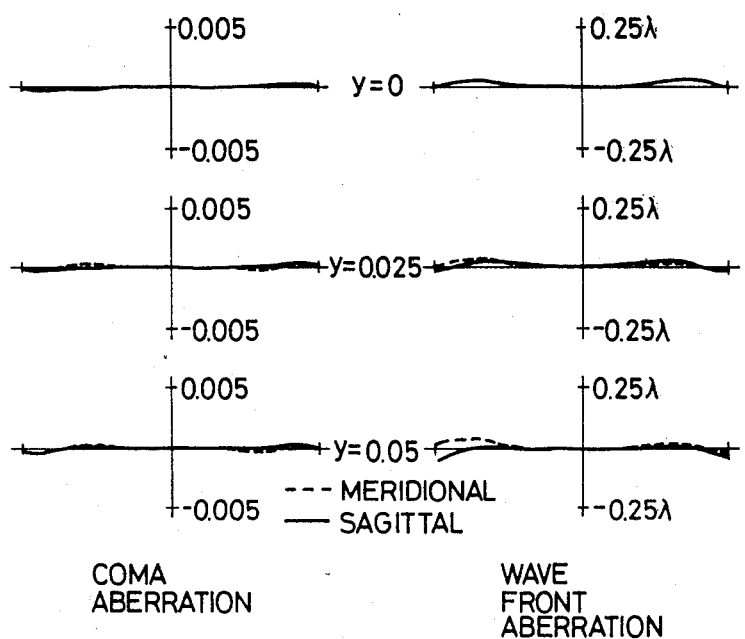
FIG. 4 is a graphical representation indicating the coma aberration and wave front aberration of the objective system shown in FIG. 3.

The arrangements of the lens components in Examples 1 and 2 are as shown in FIGS. 1 and 3, respectively, and the coma aberrations and the wave front aberrations thereof are as indicated in FIGS. 2 and 4. It should be noted that the coma aberration and wave front aberration in FIGS. 2 and 4 are those when the cover glass is taken into account.

What is claimed is:

1. An objective system for a video disc, comprising: a first lens component including a positive meniscus lens convex to the light source, a second lens component including a positive meniscus lens convex to the light source, a third lens component including a positive meniscus lens concave to the light source and having a relatively long focal length, and a cover glass for said video disc, said objective system satisfying the following conditions:

$$F/0.55 < F_1 < F/0.25 \quad (1)$$

$$F/1.0 < F_2 < F/0.5 \quad (2)$$

$$F_3 > F/0.15 \quad (3)$$

$$F < |r_5| < 3F, \ r_5 < 0 \quad (4)$$

$$d_2 < 0.2F \quad (5)$$

$$d_4 < 0.3F \quad (6)$$

where F is the resultant focal length of the overall lens system, $F_i$ is the focal length of the i-th lens component, $r_i$ is the radius of curvature of the i-th surface, $d_i$ is the thickness or air gap of the i-th lens, and $N_i$ is the refractive index of the i-th lens.

2. An objective system for a video disc, comprising: a first lens component including a positive meniscus lens convex to the light source, a second lens component including a positive meniscus lens convex to the light source, a third lens component including a positive meniscus lens concave to the light source and having a relatively long focal length, and a cover glass for said video disc, said objective system satisfying the following conditions:

$r_1 = 6.835$    $d_1 = 1.54$    $N_1 = 1.74411$
$r_2 = 42.333$    $d_2 = 0.10$
$r_3 = 4.125$    $d_3 = 1.33$    $N_2 = 1.74411$
$r_4 = 21.293$    $d_4 = 0.33$
$r_5 = -7.392$    $d_5 = 1.52$    $N_3 = 1.74411$
$r_6 = -6.453$
$F = 4.50$    N.A. = 0.50
$Wt = 1.35$    $t = 1.20$    $Nt = 1.49$
$F_1 = 10.75 = F/0.42$
$F_2 = 6.65 = F/0.67$
$F_3 = 40.38 = F/0.11$ where $r_i$ is the radius of curvature of the i-th lens surface, $d_i$ is the lens thickness or the air gap between the i-th lens surface and the adjacent lens surface, $N_i$ is the refractive index of the i-th lens with respect to a ray of light having a wavelength of 780 nm, F is the overall focal length, N.A. is the numerical aperture, $F_1$ is the focal length of said first lens component, $F_2$ is the focal length of said second lens component, $F_3$ is the focal length of said lens components, t is the thickness of said cover glass, Nt is the refractive index of said cover glass, and Wt is the air gap or operating distance between said third lens component and said cover glass.

3. An objective system for a video disc, comprising: a first lens component including a positive meniscus lens convex to the light sorce, a second lens component including positive meniscus lens convex to the light source, a third lens component including a positive meniscus lens concave to the light source and having a relatively long focal length, and a cover glass for said video disc, said objective system satisfying the following conditions:

$r_1 = 6.892$    $d_1 = 1.28$    $N_1 = 1.74411$
$r_2 = 39.758$    $d_2 = 0.10$
$r_3 = 4.148$    $d_3 = 1.31$    $N_2 = 1.74411$
$r_4 = 22.199$    $d_4 = 0.30$
$r_5 = -9.930$    $d_5 = 1.88$    $N_3 = 1.86890$
$r_6 = -8.450$
$F = 4.50$    N.A. = 0.50
$Wt = 1.35$    $t = 1.20$    $Nt = 1.49$
$F_1 = 11.02 = F/0.41$
$F_2 = 6.65 = F/0.67$
$F_3 = 41.02 = F/0.11$ where $r_i$ is the radius of curvature of the i-th lens surface, $d_i$ is the lens thickness or the air gap between the i-th lens surface and the adjacent lens surface, $N_i$ is the refractive index of the i-th lens with respect to a ray of light having a wavelength of 780 nm, F is the overall focal length, N.A. is the numerical aperture, $F_1$ is the focal length of said first lens components, $F_2$ is the focal length of said second lens component, $F_3$ is the focal length of said lens components, t is the thickness of said cover glass, Nt is the refractive index of said cover glass, and Wt is the air gap or operating distance between said third lens component and said cover glass.

* * * * *